(12) United States Patent
Liang et al.

(10) Patent No.: US 9,153,846 B2
(45) Date of Patent: Oct. 6, 2015

(54) BATTERY PACK AND METHOD OF CONTROLLING CHARGE-AND-DISCHARGE OF BATTERY PACK BY ITS THERMOELECTRIC PROPERTY

(75) Inventors: Shih-Hao Liang, New Taipei (TW);
Yu-Min Peng, Hsinchu (TW);
Shou-Hung Ling, Taipei (TW);
Chung-Jen Chou, Yunlin County (TW);
Chein-Chung Sun, Kaohsiung (TW);
Chun-Ho Tai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 540 days.

(21) Appl. No.: 13/532,787

(22) Filed: Jun. 26, 2012

(65) Prior Publication Data
US 2013/0127423 A1    May 23, 2013

(30) Foreign Application Priority Data

Nov. 17, 2011    (TW) .............................. 100142012 A

(51) Int. Cl.
*H02J 7/00*    (2006.01)
*H01M 10/44*    (2006.01)
(Continued)

(52) U.S. Cl.
CPC .......... *H01M 10/443* (2013.01); *H01M 10/617* (2015.04); *H02J 7/0016* (2013.01); *H02J 7/0091* (2013.01); *H01M 10/651* (2015.04); *H02J 2007/0067* (2013.01)

(58) Field of Classification Search
CPC ....... G06F 21/73; G06F 21/79; G06F 3/0383; G06F 3/04897; G06F 1/206; G06F 1/1616; G06F 1/1626; G06F 1/163; G06F 1/1632; G06F 1/1637; G06F 1/1656; G06F 1/1662; G06F 1/1686; G06F 1/1698
USPC .................................................. 320/130–137
See application file for complete search history.

(56) References Cited

U.S. PATENT DOCUMENTS

| | | | |
|---|---|---|---|
| 5,902,467 | A | 5/1999 | Wang et al. |
| 6,288,521 | B1 | 9/2001 | Meador |
| 7,459,882 | B2 | 12/2008 | Morgan |

(Continued)

FOREIGN PATENT DOCUMENTS

| | | |
|---|---|---|
| CN | 101944641 | 1/2011 |
| CN | 201726165 | 1/2011 |

(Continued)

OTHER PUBLICATIONS

"Office Action of China Counterpart Application", issued on Aug. 22, 2014, p. 1-p. 8.

(Continued)

*Primary Examiner* — Binh Tat
(74) *Attorney, Agent, or Firm* — Jianq Chyun IP Office

(57) ABSTRACT

A battery pack and a method for controlling charge-and-discharge of the battery pack by its thermoelectric property are provided, in which the battery pack has a plurality of thermal regions divided by different ranges of temperature. The battery pack includes a plurality of parallel-connected battery groups and a plurality of variable resistances. The parallel-connected battery groups are located in the thermal regions respectively, and each of the parallel-connected battery groups includes batteries connected in parallel. The variable resistances are disposed between two parallel-connected battery groups.

11 Claims, 3 Drawing Sheets

(51) Int. Cl.
 H01M 10/617 (2014.01)
 H01M 10/651 (2014.01)

(56) References Cited

U.S. PATENT DOCUMENTS

| | | | |
|---|---|---|---|
| 7,531,990 B2 | 5/2009 | Morita et al. | |
| 7,609,034 B2 | 10/2009 | Tanjou | |
| 2002/0079865 A1* | 6/2002 | Thomas et al. | 320/136 |
| 2005/0258805 A1* | 11/2005 | Thomas et al. | 320/134 |
| 2007/0126400 A1 | 6/2007 | Benckenstein, Jr. et al. | |
| 2009/0208815 A1 | 8/2009 | Dougherty | |
| 2010/0236854 A1 | 9/2010 | Nakamura | |
| 2010/0253285 A1 | 10/2010 | Takahashi et al. | |
| 2011/0003182 A1 | 1/2011 | Zhu | |

FOREIGN PATENT DOCUMENTS

| | | |
|---|---|---|
| JP | 09-163501 | 6/1997 |
| JP | 2007294175 | 11/2007 |
| KR | 20100035912 | 4/2010 |
| TW | 201004016 | 1/2010 |
| TW | 1344231 | 6/2011 |
| TW | 201121196 | 6/2011 |

OTHER PUBLICATIONS

"Office Action of Taiwan Counterpart Application", issued on Apr. 16, 2014, p. 1-p. 6.

Wu et al., "Numerical simulation for the discharge behaviors of batteries in series and/or parallel-connected battery pack", Electrochimica Acta, vol. 52, 2006, p. 1349-p. 1357.

Zhang et al., "Modeling Discharge Behavior of Multicell Battery", IEEE Transactions on Energy Conversion, vol. 25, No. 4, Dec. 2010, p. 1133-p. 1141.

Wood et al., "Investigation of battery end-of-life conditions for plug-in hybrid electric vehicles", Journal of Power Sources, vol. 196, 2011, p. 5147-p. 5154.

Wang et al., "Intelligent Battery Management System with Parallel-connected Cell-balance Algorithm on the Humanoid Robot", IEEE Workshop on Advanced Robotics and Its Social Impacts, 2007, p. 1-p. 6.

* cited by examiner

BATTERY PACK AND METHOD OF CONTROLLING CHARGE-AND-DISCHARGE OF BATTERY PACK BY ITS THERMOELECTRIC PROPERTY

CROSS-REFERENCE TO RELATED APPLICATION

This application claims the priority benefit of Taiwan application serial no. 100142012, filed on Nov. 17, 2011. The entirety of the above-mentioned patent application is hereby incorporated by reference herein and made a part of this specification.

TECHNICAL FIELD

The disclosure relates to a battery pack, and a method for controlling the battery pack through a discharge sequence of the parallel-connected battery groups according to an ambient temperature.

BACKGROUND

Batteries are welded in series or in parallel to form a battery pack. Along with different assembly manners and different heat-dissipation environments, the larger the number of batteries is, the poorer the temperature uniformity of the batteries is. Therefore, the degradation of the batteries in a certain region of the battery pack is faster than that of the batteries in other regions. If the problem cannot be solved, the degradation of slightly damaged batteries may be accelerated, and the originally perfect battery may be damaged ahead of time due to the influence of the damaged batteries, which is a reason why the lifetime of the battery pack is shorter than that of a battery. Particularly, the risk of damage more easily occurs to the battery pack with a larger capacity.

Therefore, the temperature uniformity of batteries in the battery pack will benefit the lifetime of the battery pack, which is achieved by controlling each of the batteries and by using a cooling device for the purpose of temperature uniformity and heat dissipation. According to the basic theory of heat transfer, there are three manners of temperature control method for the battery, which can be understood from the following heat transfer formula:

$$\rho V C_P \frac{\partial T}{\partial t} = -hA(T - T_{ambient}) + \dot{Q}_v$$

The temperature rising of the battery is caused by the residual energy after subtracting the amount of heat dissipated to the environment from the amount of heat generated.

In the above formula, $$\rho V C_P \frac{\partial T}{\partial t}$$

is temperature change rate of a substance in a transient state, and is related to specific heat and mass. The manner of controlling the temperature of the battery includes: immersing the battery into other high specific heat capacity materials, so that the temperature rising is limited since the materials need to absorb a great deal of latent heat during phase change.

In the formula, $-hA(T-T_{ambient})$ represents external energy loss, and is related to a thermal convection coefficient, a heat-dissipation area, and a difference between the object surface temperature and ambient temperature. Such a battery temperature control manner is based on temperature control through heat dissipation and needs active thermal management, so the cost needs to be increased to fabricate a heat-dissipation system.

$\dot{Q}_v$ is an overall heat generation rate, corresponding to a manner of controlling the amount of heat generated to indirectly control the temperature.

SUMMARY

The disclosure provides a battery pack, which has a plurality of thermal regions divided by different ranges of temperature. The battery pack includes a plurality of parallel-connected battery groups and a plurality of variable resistances. Each of the parallel-connected battery groups is located in each of the thermal region, and is formed by a plurality of batteries connected in parallel. The variable resistances are disposed between two parallel-connected battery groups.

The disclosure further provides a method for controlling a battery pack, which includes: first providing a battery pack, where the battery pack has a plurality of thermal regions divided by different ranges of temperature. The battery pack includes a plurality of parallel-connected battery groups and a plurality of variable resistances. Each of the parallel-connected battery groups is located in each of the thermal regions, and each of the variable resistances is disposed between two parallel-connected battery groups. Then, a discharge sequence of the parallel-connected battery groups is controlled according to an ambient temperature.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
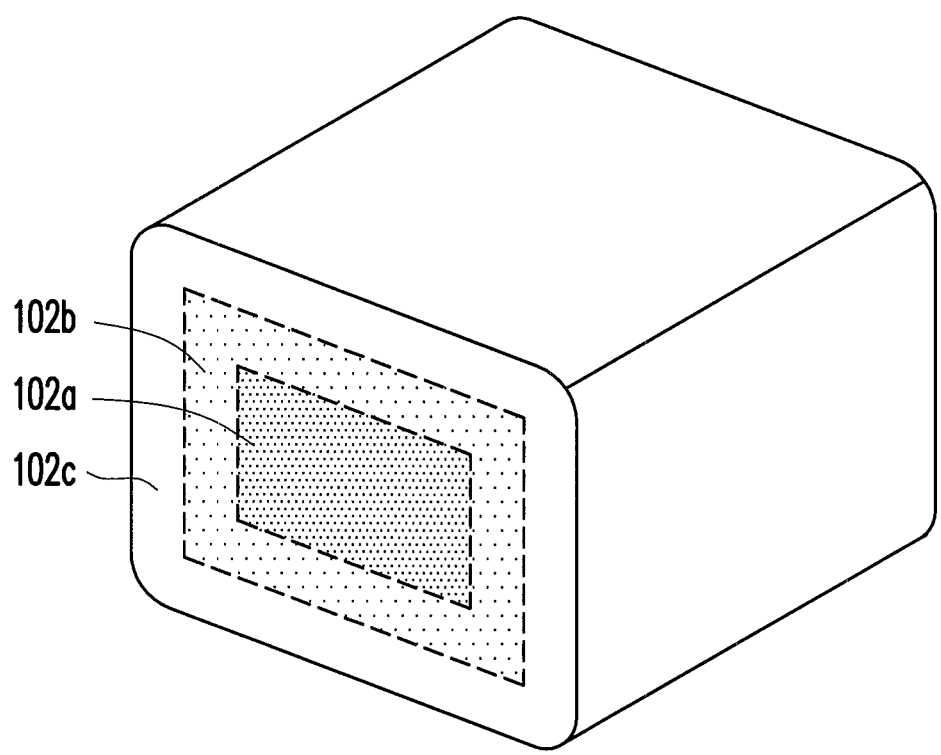
FIG. 1 is a schematic diagram illustrating different thermal regions divided by the ranges of temperature in a battery pack.

A battery pack is formed by multiple batteries. When an ambient temperature and a heat-dissipation condition of the battery pack vary due to the location and operating condition of the individual battery in a pack, the batteries in the battery pack may experience unequal heat dissipation conditions, resulting in non-uniform temperatures, as shown in FIG. 1. It is assumed that, the battery pack 100 in FIG. 1 has working temperatures of three thermal regions 102a, 102b and 102c during discharge. The different thermal regions 102a, 102b and 102c are divided by different ranges of temperature. An overall temperature difference in all of the thermal regions 102a-102c is, for example, within 20° C., and a temperature difference in each of the thermal regions 102a-102c is, for example, within 5° C. Even if the properties of the batteries in the battery pack 100 are close to each other, the properties may vary due to different temperatures; in one embodiment, internal impedances of the batteries are different.

The non-uniform temperature effect of the batteries in the battery pack 100 may cause different internal impedances of the batteries. Therefore, at initial stage of discharge, an output current of the batteries in a high-temperature region is greater than that in a low-temperature region, and the voltage of the batteries in the high-temperature region is lower than that in the low-temperature region when the battery status is dropped to low capacity. The closer the discharge capacity reaches a lowest limit of the discharge voltage, the larger a voltage different of the batteries in between the high-temperature region and the low-temperature region is. Hence, at the moment when the discharge stops, the batteries discharging a smaller electric current in the parallel-connected module transfer the electric power to other batteries in an instant due to a voltage balance effect. The discharge in high current results in battery damage. As discussed as above, different working temperature and residual battery capacity of each of the batteries in different thermal regions may result in potential imbalance, hence the co-called self-balanced current flow between batteries may be occurred.

Therefore, the concept of the disclosure is to design the configuration of batteries in the battery pack according to different thermal regions, whereby solving the problem in decreased lifetime of the battery pack caused by the self-balanced current flow between batteries.

Figure 2:
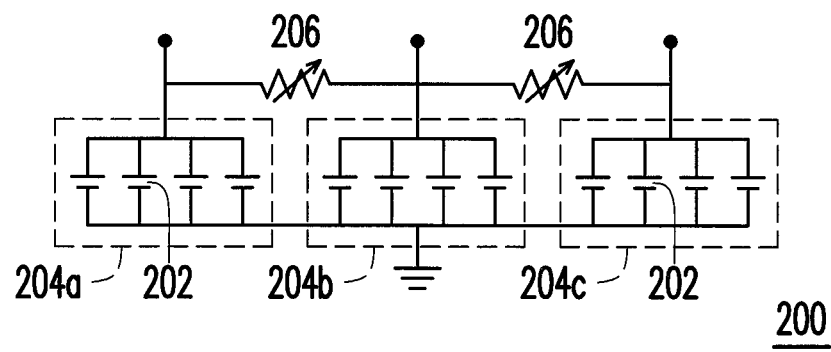
FIG. 2 is a circuit diagram illustrating a battery pack according to a first exemplary embodiment of the disclosure.

FIG. 2 is a circuit diagram illustrating a battery pack according to a first exemplary embodiment of the disclosure.

Referring to FIG. 2, when a battery pack 200 of this embodiment experiences temperature non-uniformity which is the same as that in FIG. 1 in actual operation, the batteries 202 in different thermal regions (102a-102c as shown in FIG. 1) are connected in parallel into a group, to obtain three parallel-connected battery groups 204a-204c. Meanwhile, a variable resistance 206 is disposed between two parallel-connected battery groups 204a-204c. When the battery pack 200 discharges or is charged for a period of time and then stops the operation, the internal impedance of each of the parallel-connected battery groups 204a-204c varies due to the non-uniform temperature effect, which indirectly affects individual discharged battery capacity of the parallel-connected battery groups 204a-204c, and results in potential differences of the parallel-connected battery groups 204a-204c. At this time, the variable resistance 206 may exert an effect during potential balancing when the charge or discharge stops. Therefore, the large current flow from the low temperature battery group to the high temperature battery group is prevented by the variable resistance between two of parallel-connected battery groups.

Since the battery pack 200 of this embodiment does not require temperature uniformity, and only different parallel-connected battery groups are distinguished according to different actual working temperatures, the degradation degrees and electric capacities of the parallel-connected battery groups may be different, so that not only the lifetime of the battery pack can be prolonged, but the capacity of each battery groups can be individually used more efficiently according to each degradation rate of the battery groups.

Figure 3:
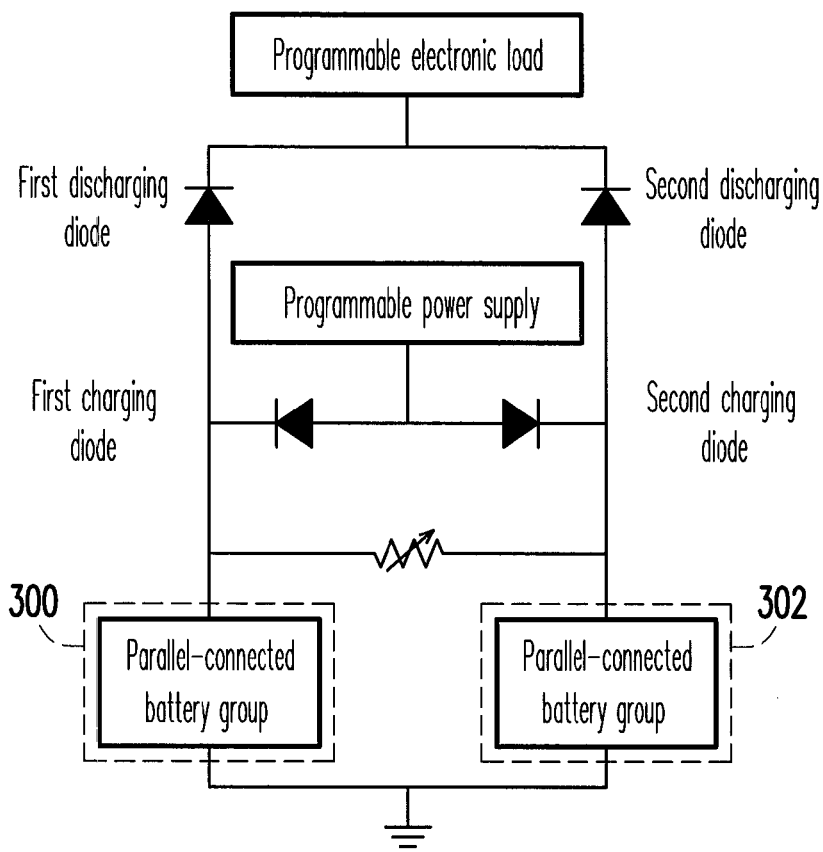
FIG. 3 is a block diagram illustrating hardware architecture of an experimental example according to the first exemplary embodiment.

An experimental example performed according to the first exemplary embodiment is as shown in FIG. 3, which is a block diagram illustrating hardware architecture.

In FIG. 3, the batteries are divided into two parallel-connected battery groups, which are respectively placed in thermal regions 300 and 302 of 45° C. and 25° C. Several diodes are used to restrict the current flow direction. For example, during charge, a programmable electronic load is switched off, and a programmable power supply is switched on. At this time, the current charges the two parallel-connected battery groups respectively through a first charging diode and a second charging diode. At the moment when the charge stops, the first charging diode and the second charging diode can prevent a current flow between two battery groups caused by the potential imbalance. Although the potential imbalance is occurred, the current is slowly delivered to the low potential battery group through the variable resistance.

On the contrary, during discharge, the programmable electronic load is switched on, and the programmable power supply is switched off. At this time, the current delivers the electric power of the two parallel-connected battery groups to the programmable electronic load through a first discharging diode and a second discharging diode. At the moment when the discharge stops, the first discharging diode and the second discharging diode may prevent a current flow between two battery groups caused by the potential imbalance. Although the potential imbalance is occurred, the current is slowly delivered to the low potential battery group through the variable resistance.

During charge and discharge, the temperature effect may affect the internal impedance and the available charge-and-discharge capacity of the battery. The discharge capacity is reduced because of the low temperature effect may cause that the battery soon reaches the lowest limit of the discharge voltage. The discharge is performed for 50 seconds and stops for 10 seconds in order to observe the temperature effect, and the batteries are subjected to a charge-and-discharge cycle test.

In another comparison example, the variable resistance is not added, but the variable resistance in FIG. 3 is changed into an electrical wire. That is to say, the batteries of the two parallel-connected battery groups are not controlled, and at the moment when the discharge stops, high current may be recharged into the parallel-connected battery group with a high temperature (45° C.), and likewise, the charge-and-discharge cycle test is performed. The following result is obtained: a battery capacity fading rate obtained when the variable resistance is added between two parallel-connected battery groups is slower than that obtained in the comparison example where only the electrical wire is used, and the capacity fading rate is reduced by 30%. The term "battery capacity fading rate" refers to as a value of the degradation of the battery, and is a degradation rate obtained through estimation by using the decrease of battery capacity and the cycle number of charge-and-discharge.

Figure 4:
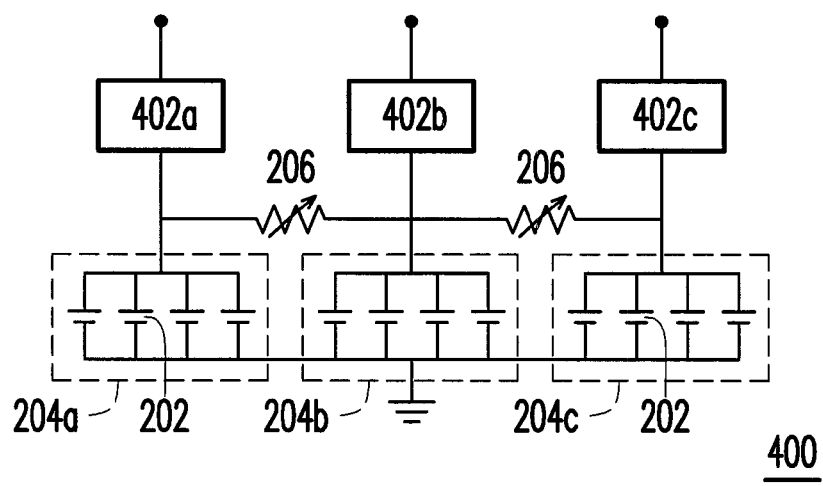
FIG. 4 is a circuit diagram illustrating a battery pack according to a second exemplary embodiment of the disclosure.

FIG. 4 is a circuit diagram illustrating a battery pack according to a second exemplary embodiment of the disclosure, in which the same reference numerals as those in FIG. 2 are used to represent same or similar parts.

Referring to FIG. 4, a battery packet 400 of this embodiment not only includes the three parallel-connected battery groups 204a-204c and the variable resistance 206 as described in FIG. 2, but also includes a plurality of current control devices 402a-402c. Each current control device is connected to each of the parallel-connected battery groups 204a-204c, so as to respectively control a discharge sequence of the parallel-connected battery groups 204a-204c. In addition, an overall temperature difference in different thermal regions where the parallel-connected battery groups 204a-

204c are located is, for example, within 20° C., and a temperature difference in each of the thermal regions is, for example, within 5° C.

Figure 5:
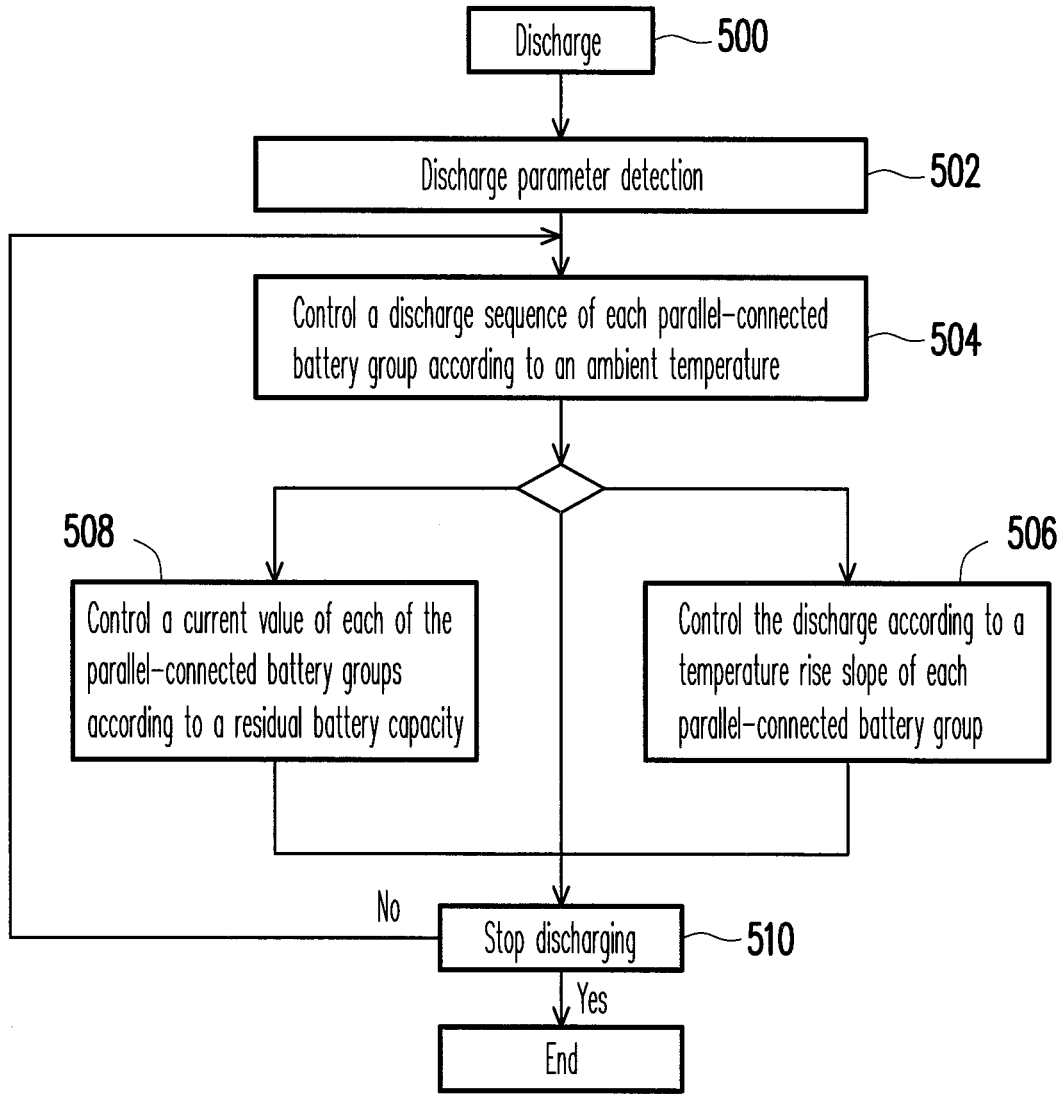
FIG. 5 is a flowchart illustrating a method for controlling a battery pack according to a third exemplary embodiment of the disclosure.

FIG. 5 is a flowchart illustrating a method for controlling a battery pack according to a third exemplary embodiment of the disclosure.

Referring to FIG. 5, in step 500, a battery pack discharges, where the battery pack in this step includes a plurality of parallel-connected battery groups 240a-204c and a plurality of variable resistances 206, similar to FIG. 4. Each of the parallel-connected battery groups is disposed in each of the thermal regions, and each variable resistance is disposed between two parallel-connected battery groups.

Then, before step 504 is performed, in step 502, discharge parameter detection is performed to obtain discharge parameters of each parallel-connected battery group of the battery packs, for example, the best temperature $T_{best}$, the maximum current $I_{max}$, the maximum overall discharge capacity $Ah_{max}$, and the maximum temperature rising slope $$\frac{dT}{dt_{max}}.$$

Afterwards, step 504 is performed. A discharge sequence of each parallel-connected battery group is controlled according to an ambient temperature, and a device such as a current control device may be used for control. For example, when the ambient temperature is lower than a set temperature (for example, $T_{best}$), the parallel-connected battery group in a high-temperature location of the thermal regions discharges earlier than the parallel-connected battery group in a low-temperature location, so that the high-temperature parallel-connected battery group may transfer the heat energy to the low-temperature parallel-connected battery group to set the battery packs to a proper operating temperature, so as to fully utilize the waste heat. In this embodiment, the battery temperature in the thermal region depends on a position, a heat-dissipation condition and a waste heat transfer path of each parallel-connected battery group.

On the contrary, when the ambient temperature is higher than the set temperature, the parallel-connected battery group in a low-temperature location of the thermal regions discharges earlier than the parallel-connected battery group in a high-temperature location. Since the parallel-connected battery group in the low-temperature location easily performs heat dissipation, little heat energy is transferred to the parallel-connected battery group in the high-temperature location.

In addition to step 504, in this embodiment, step 506 and/or step 508 may be further performed. In step 506, the discharge is controlled according to a temperature rising slope of each parallel-connected battery group. That is to say, when the temperature rising slope in a certain location of the thermal regions exceeds a set slope (for example, $$\frac{dT}{dt_{max}}),$$

it indicates that the rate of temperature rising exceeds a reasonable range, and a safety protection mechanism needs to be started, to stop the discharge of the parallel-connected battery group corresponding to the region.

In step 508, a current value of each of the parallel-connected battery groups is controlled according to a residual battery capacity. For example, assuming that $Ah_t$ is a currently discharged capacity, when a value of current $I_i$ causes that the currently residual battery capacity $(Ah_{max}-Ah_t)$ cannot be used for 0.2 hours, as shown in the following formula:

$$I_i > \frac{Ah_{max} - Ah_i}{0.2 \text{ hours}},$$

the value of current $I_i$ needs to be reduced, so that the discharge time may be increased to 0.2 hours.

Steps 506 and 508 belong to another implementation, and may be performed at the same time, or individually performed in succession, or performed in any sequence. As for the control of the battery packs, preferably, determination results of steps 506 and 508 are used for comprehensive consideration, the currents determined by steps 506 and 508 are compared, and the minimum current value is used as the set value. After step 504 and step 506/508 are completed, if the process does not proceed to step 510 where the battery pack stops discharging, the control algorithm starting from step 504 needs to be repeated during each time of discharge.

Based on the above, in the disclosure, the batteries with the same thermoelectric property are grouped, a pseudo-isothermal grouping method is used in combination with the hardware of the variable resistance, so as to balance potential differences between the groups at the moment when the discharge is ended, where the potential balance is achieved through a variable resistance path of a small-current flow rate. In addition, the disclosure does not need to control single battery and only needs to individually control the groups, thus saving the cost and prolonging the battery lifetime through combination of software and hardware.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A battery pack, having a plurality of thermal regions divided by different ranges of temperature, comprising:
    a plurality of parallel-connected battery groups, respectively located in the thermal regions, wherein each of the parallel-connected battery groups is formed by a plurality of batteries connected in parallel;
    a plurality of variable resistances, each disposed between two parallel-connected battery groups, and
    a plurality of current control devices respectively connected to the parallel-connected battery groups to control a discharge sequence of the parallel-connected battery groups,
    wherein when an ambient temperature is lower than a set temperature, the parallel-connected battery group in a high-temperature location of the thermal regions is controlled to discharge earlier than the parallel-connected battery group in a low-temperature location, and
    wherein a battery temperature in each of the thermal regions depends on a position, a heat-dissipation condition and a waste heat transfer path of each parallel-connected battery group.

2. The battery pack according to claim 1, wherein the thermal regions are set according to the ambient temperature and a heat-dissipation condition of the battery pack.

3. The battery pack according to claim 1, wherein an overall temperature difference in all of the thermal regions is within 20° C.

4. The battery pack according to claim 1, wherein a temperature difference in each of the thermal regions is within 5° C.

5. A method for controlling a battery pack, comprising:

providing a battery pack having a plurality of thermal regions divided by different ranges of temperature, wherein the battery pack comprises a plurality of parallel-connected battery groups and a plurality of variable resistances, each of the parallel-connected battery groups is located in each of the thermal regions, and each variable resistance is disposed between two parallel-connected battery groups; and controlling a discharge sequence of the parallel-connected battery groups according to an ambient temperature, wherein the step of controlling the discharge sequence of the parallel-connected battery groups comprises using a plurality of current control devices to respectively control the parallel-connected battery groups, wherein a method for controlling the discharge sequence of the parallel-connected battery groups comprises: discharging the parallel-connected battery group in a high-temperature location of the thermal regions earlier than the parallel-connected battery group in a low-temperature location when the ambient temperature is lower than a set temperature, and wherein a battery temperature in each of the thermal regions depends on a position, a heat-dissipation condition and a waste heat transfer path of each parallel-connected battery group.

6. The method for controlling a battery pack according to claim 5, wherein a method for controlling the discharge sequence of the parallel-connected battery groups further comprises: discharging the parallel-connected battery group in the low-temperature location in the thermal regions earlier than the parallel-connected battery group in the high-temperature location when the ambient temperature is higher than the set temperature.

7. The method for controlling a battery pack according to claim 5, further comprising: controlling the discharge according to a temperature rising slope of each parallel-connected battery group.

8. The method for controlling a battery pack according to claim 5, further comprising: controlling a current value of each parallel-connected battery group according to a residual battery capacity.

9. The method for controlling a battery pack according to claim 5, wherein the thermal regions are set according to the ambient temperature and a heat-dissipation condition of the battery pack.

10. The method for controlling a battery pack according to claim 5, wherein an overall temperature difference in all of the thermal regions is within 20° C.

11. The method for controlling a battery pack according to claim 5, wherein a temperature difference in each of the thermal regions is within 5° C.

* * * * *